United States Patent
De Rosa et al.

(10) Patent No.: US 10,165,539 B2
(45) Date of Patent: Dec. 25, 2018

(54) SPECTRUM ADMISSION CONTROL

(71) Applicants: AT&T Intellectual Property I, L.P., Atlanta, GA (US); AT&T Mobility II LLC, Atlanta, GA (US)

(72) Inventors: Giuseppe De Rosa, Atlanta, GA (US); Arthur R. Brisebois, Cumming, GA (US); Zhi Cui, Sugar Hill, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/134,012

(22) Filed: Apr. 20, 2016

(65) Prior Publication Data

US 2017/0311277 A1    Oct. 26, 2017

(51) Int. Cl.
| | |
|---|---|
| H04W 4/00 | (2018.01) |
| H04W 60/04 | (2009.01) |
| H04W 16/14 | (2009.01) |
| H04W 48/18 | (2009.01) |

(52) U.S. Cl.
CPC ........... *H04W 60/04* (2013.01); *H04W 16/14* (2013.01); *H04W 48/18* (2013.01)

(58) Field of Classification Search
CPC ..... H04W 16/14; H04W 16/10; H04W 72/10; H04W 72/02; H04W 28/26; H04W 72/04; H04B 17/382
USPC ...................................................... 455/435.3
See application file for complete search history.

(56) References Cited

U.S. PATENT DOCUMENTS

| | | | |
|---|---|---|---|
| 7,738,890 B1 | 6/2010 | Shull | |
| 8,131,304 B2 | 3/2012 | Chaudhri et al. | |
| 8,145,230 B2 | 3/2012 | Callaway, Jr. et al. | |
| 8,660,498 B2 | 2/2014 | Gurney et al. | |
| 2012/0094681 A1 | 4/2012 | Freda et al. | |
| 2012/0120887 A1 | 5/2012 | Deaton et al. | |
| 2013/0301681 A1 | 11/2013 | Hassan et al. | |
| 2014/0011509 A1* | 1/2014 | Markwart | H04W 72/082 455/452.1 |
| 2014/0029585 A1 | 1/2014 | Freda et al. | |
| 2014/0233472 A1 | 8/2014 | Kadel | |
| 2015/0119059 A1 | 4/2015 | Miao et al. | |

(Continued)

FOREIGN PATENT DOCUMENTS

| | | | | |
|---|---|---|---|---|
| WO | WO 2010113494 A1 * | 10/2010 | ............ | H04W 16/14 |
| WO | WO 2012072119 A1 * | 6/2012 | ............ | H04W 16/14 |

(Continued)

*Primary Examiner* — Timothy Pham
(74) *Attorney, Agent, or Firm* — Zagorin Cave LLP (57) ABSTRACT

A primary user of a spectrum, such as a licensed user, has primary access authority to use of a spectrum. A plurality of secondary users of the spectrum, which may be unlicensed users, have secondary access authority to use of the spectrum. When the primary user wants to use the spectrum, the primary user sends a message that is propagated to all the secondary users in a geographic region that the primary user wants to use the spectrum. The message specifies the duration of time and the geographic region (location of use) where the primary user wants to use the spectrum. The secondary users in the location of use immediately stop using the spectrum for the duration of time specified in the message and then may resume use of the spectrum.

18 Claims, 7 Drawing Sheets

(56) References Cited

U.S. PATENT DOCUMENTS

| | | | |
|---|---|---|---|
| 2015/0124896 A1 | 5/2015 | Jiang | |
| 2015/0245374 A1* | 8/2015 | Mitola, III | G06Q 30/08 370/329 |
| 2015/0312891 A1 | 10/2015 | Quinn et al. | |
| 2015/0326372 A1* | 11/2015 | Ghosh | H04W 16/14 370/329 |
| 2016/0270034 A1* | 9/2016 | Chai | H04W 16/04 |
| 2016/0330743 A1* | 11/2016 | Das | H04L 67/142 |
| 2016/0360419 A1* | 12/2016 | Zapanta | H04W 16/14 |
| 2016/0360422 A1* | 12/2016 | Zhang | H04W 16/14 |

FOREIGN PATENT DOCUMENTS

| | | | | |
|---|---|---|---|---|
| WO | WO 2014118592 A1 | | 8/2014 | |
| WO | WO 2014144079 A2 | | 9/2014 | |
| WO | WO 2015084959 A1 | * | 6/2015 | G06Q 30/08 |
| WO | WO 2015123816 | * | 8/2015 | |

* cited by examiner

SPECTRUM ADMISSION CONTROL

BACKGROUND

Field of the Disclosure

This disclosure relates to sharing spectrum between primary and secondary users of a spectrum band.

Description of the Related Art

Geo-location database (DB) systems are currently being considered for database assisted spectrum assignment in shared mode. The geo-location database keeps various information on spectrum license assignees users (primary users) and possibly non spectrum license assignees users (secondary users). For example, TV White Space (TVWS) are frequencies available for unlicensed use at locations where the frequencies are not currently used by the TV broadcaster (the primary user in this example). TV broadcast may also be limited to particular times or locations. Thus, a TVWS database stores TV tower locations, antenna heights, user types, device transmitter power, technology, operation channel(s), duration of use, and other relevant information. In a database-based spectrum access scheme, secondary users first query the database about the available shared frequencies in their geo-location in terms of latitude and longitude, and in return receive the list of unoccupied shared frequencies before initiating a communication. That approach may be sufficient in static conditions where the primary user is statically utilizing shared spectrum in a defined and limited location/region. However, the database lookup scheme may result in inefficient use of shared spectrum where more dynamic use of shared spectrum is desirable.

SUMMARY OF EMBODIMENTS

A dynamic spectrum access approach, where at least some of the users, primary and/or secondary, are mobile and discontinuously active, should provide dynamic information relative to spectrum availability in space and time.

Accordingly, in one embodiment a method is provided that includes sending a message from a primary user node, having a first access authority to use of a spectrum, to one or more secondary user nodes of the spectrum having a second access authority to use of the spectrum that is lower than the first access authority, and wherein the message specifies a duration of use by the primary user.

In another embodiment a secondary user node (e.g., a wireless operator's base station) is configured to receive a message from a primary user node of a spectrum having a higher access authority to the spectrum than the secondary user node. The message indicates that the primary user node wants use of the spectrum. The message specifies a duration of use by the primary user node. The secondary user node is responsive to the message to avoid use of the spectrum during the duration of use by the primary user node.

In another embodiment a system includes a primary user having a first access authority to use of a spectrum. The system further includes a plurality of secondary users of the spectrum having a second access authority to use of the spectrum, the second access authority being lower than the first access authority. The primary user is configured to send a message to at least one of the secondary users indicating that the secondary users should stop using the spectrum for a specified duration in a specified geographic location.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

A shared radio spectrum resource, also referred to herein as spectrumX, is accessed according to a spectrum admission control mechanism that provides dynamic access to the spectrum. A primary user may be a licensed user of the spectrum. The primary user (or users) have higher access authority for spectrum use than the secondary users. SpectrumX can be accessed/borrowed from the primary user(s) (license assignee) of spectrumX when/where the primary user(s) are not using the radio resource and then spectrumX can be released/returned to the primary user(s) when/where the radio resource is needed back by the primary user(s). A new signaling paradigm is employed to notify all spectrumX secondary active radio users in a specific region, referred to herein as location of spectrumX use, the access intention of a spectrum primary user. The message signaled, herein referred to as signal-0, may be technology and protocol agnostic in order to be detected by a potential heterogeneous distribution of active users in the location of spectrumX use.

In an embodiment, the mechanism to drive this type of orchestration allows primary users seeking admission to their own spectrumX to transmit a technology/protocol agnostic message signal-0 at the beginning of their session. If a secondary user is using spectrumX in the location of spectrumX use detects a signal-0 from a higher access priority entity then it will abandon spectrumX immediately.

Figure 1:
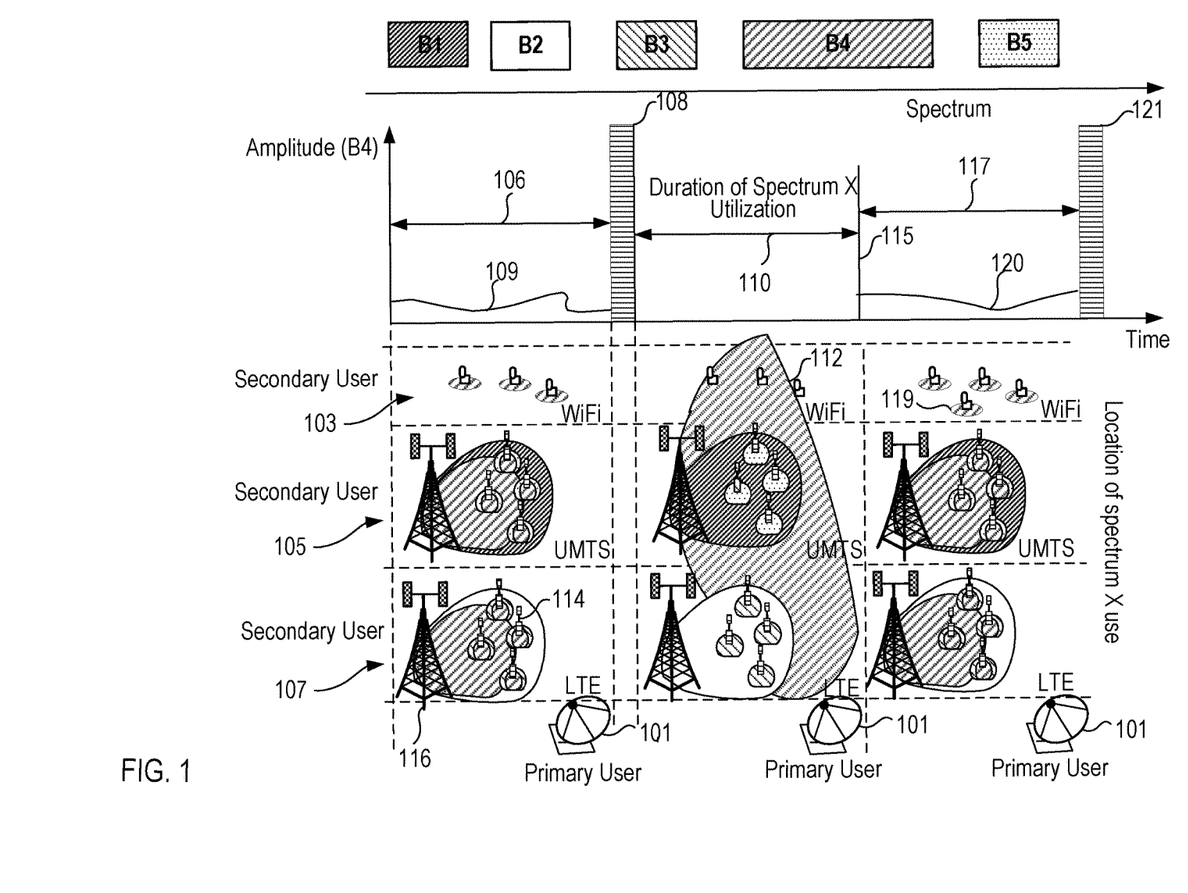
FIG. 1 illustrates a high level block diagram of a system that utilizes an embodiment of the spectrum admission control mechanism.

FIG. 1 illustrates a high level block diagram of a system that utilizes an embodiment of the spectrum admission control mechanism. The system provides two levels of priority access to spectrumX. FIG. 1 shows a primary user 101 and three different groups of secondary users 103, 105, and 107. In the embodiment of FIG. 1, the primary user is a radar system. Secondary users 103, which can be, e.g., wireless local area network access points, utilize spectrum B4 during time period 106. Secondary user group 105, for example a wireless operator using Universal Mobile Telecommunications Service (UMTS), utilizes spectrum B4, B1, and B5 during time period 106. Secondary user group 107, for example a wireless operator using Long Term Evolution (LTE) communications and may include eNodeB 116 and small cells 114, utilizes spectrum B2, B3, and B4 during time period 106.

At time 108, primary user 101 sends out a signal-0 message to all spectrumX secondary users in the location of spectrumX use about the primary user's intention to use spectrum-X. For example, if the secondary user is an LTE wireless operator in group 107, the signal-0 message may be propagated to the eNodeB in proximity to the primary user platform location, using spectrumX. Similarly, signal-0 may be propagated to the closest access point(s) of a wireless local area network or a base station using other technologies. While FIG. 1 shows signal-0 being transmitted wirelessly, in other embodiments, as described further herein, signal-0 may be transmitted over wireline or over both wireline and wirelessly to reach all secondary users. In the case of signal-0 being transmitted wirelessly, the power of the B4 spectrum rises (as shown at 108 in FIG. 1) to values above normal traffic 109 to ensure the secondary user receive the signal-0 message correctly. Signal-0 carries elemental information regarding a primary users access modalities such as the planned duration-of-spectrumX-utilization and location of spectrumX use, e.g., latitude and longitude. Upon reception and decoding of signal-0 all active secondary radio users will free up spectrumX in the location of spectrumX use for the duration of spectrum utilization communicated in signal-0 information contents.

During the duration-of-spectrumX utilization (time period 110) by the primary user of spectrumX the location of spectrumX use 112 is shown to encompass the geographic regions of secondary users 103, 105, and 107. In the embodiment illustrated in FIG. 1, spectrumX is the spectrum B4. During the time period 110 the secondary users do not use spectrum B4. Secondary user group 103, which previously had been using spectrum B4, uses no radio spectrum during time period 110. Secondary user group 105 uses spectrum B1 and B5 during time period 110. Secondary user group 107 uses spectrum B2 and B3 during time period 110.

At time 115, the duration of spectrumX use ends. The secondary users 103, 105, and 107 resume using spectrum B4 during time period 117. The spectrum use by the secondary users during time period 117 is similar to the use during time period 106. Power levels of the B4 spectrum drop back to the normal traffic level 120.

Initial access to spectrum resources spectrumX by secondary users may be regulated by a variety of mechanisms. For example, secondary users may detect if there is any energy in spectrumX and then proceed to use spectrumX if use by a primary user is not detected. That technique is commonly known as Listen Before Talk (LBT). Thus, a new secondary user 119 in secondary users 103 during time period 117 may detect by measurement if the primary user is using spectrumX via LBT, and if not, then begin use of spectrumX. However, when the primary user 101 issues the next signal-0 message at 121, all secondary users in the region of spectrum use, including secondary user 119, relinquish use of the spectrum B4 to the primary user 101 for the duration specified in the signal-0 message 121.

Figure 2A:
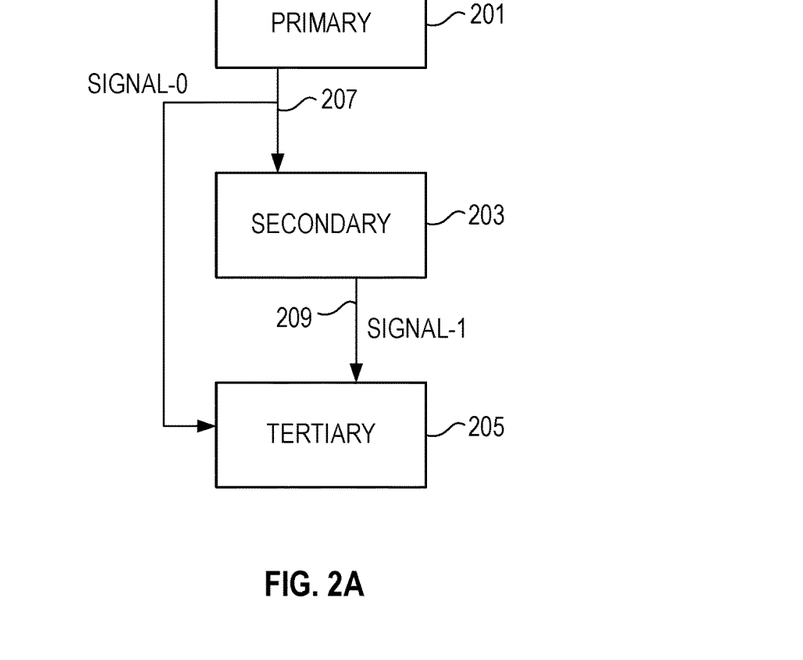
FIG. 2A illustrates an embodiment with three different access priorities to spectrum.

In embodiments described herein the utilization of signal-0 is employed by primary users seeking access to their spectrum resource when there are only primary and secondary users. In other embodiments, additional access priority gradations to spectrumX may exist. For example, as shown in FIG. 2A, three separate categories of access priority may exist, primary user(s) 201, secondary user(s) 203, and tertiary user(s) 205.

Figure 2B:
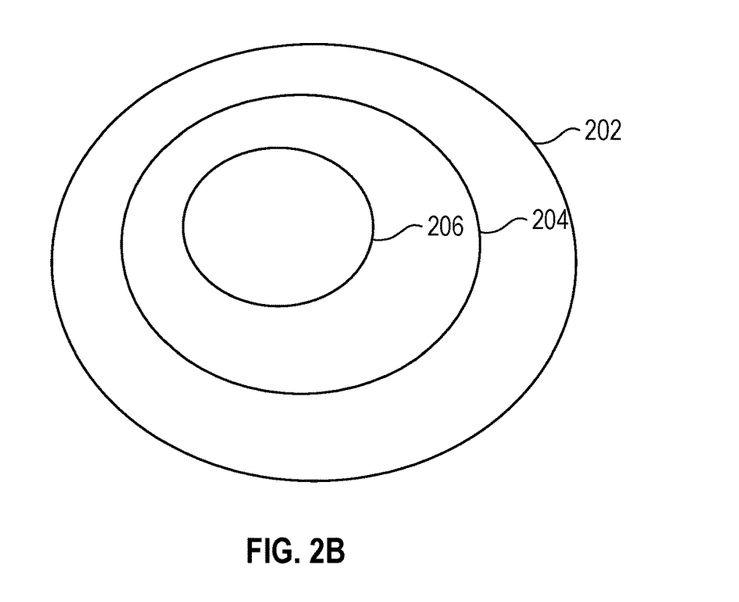
FIG. 2B illustrates an example of geographic coverage associated with the different access priorities.

FIG. 2B shows an example geographic distribution of use of spectrumX where primary user 201 uses spectrumX in region 202, secondary user 203 uses spectrumX in region 204, and tertiary user 205 uses spectrumX in region 206. Primary users have the highest priority access rights, secondary users have the second highest priority access rights and tertiary users have the lowest access priority rights. Signal-0 207 sent by primary user 201 causes the secondary users 203 and tertiary users 205 to relinquish use of spectrum in regions 205 and 206. A similar signaling (signal-1) 209 may be employed by the secondary user(s) 203 to gain access to spectrumX and force tertiary users 205 off of the spectrum. Thus, a user with secondary access priority to the spectrum, can send a signal-1 to those users with tertiary access authority forcing the tertiary users off of spectrumX. Signal-1 carries elemental information regarding the intermediate users access modalities such as the planned duration-of-spectrumX-utilization and location of spectrumX use. Upon reception and decoding of signal-1 all active radio users with tertiary access authority free up spectrumX in the location of spectrumX use and for the duration-of-spectrumX-utilization communicated in signal-1 information contents.

In the spectrum sharing scheme, multiple technologies could be deployed in the same spectrum block named spectrumX. For example, the technologies may include broadcast, satellite communications, radar, avionic, cellular, and any of a wide variety of technologies that utilize spectrum. Consequently a technology agnostic signaling may be employed to communicate the intention to access spectrumX along with the rights and the planned modality to do so to all active entities in location of spectrumX use. As opposed to the conventional admission requests where a device is admitted to use a series of resources (e.g. spectrum, radio hardware, radio software, transport, etc) in this case the request solely involves the spectrum block resource occupation in a defined region and specific time. Thus, the signal-0 message is as technology independent as possible specifying the spectrum resource, the geographic region of intended use of that resource, and the time duration of that use.

Machine learning type of functionalities may be employed to learn primary users spectrumX utilization patterns in order to reduce signaling to a minimum, where for example, the primary users are a rotational radar, time defined broadcasted news, forecast radio, or highway traffic broadcast.

Figure 3A:
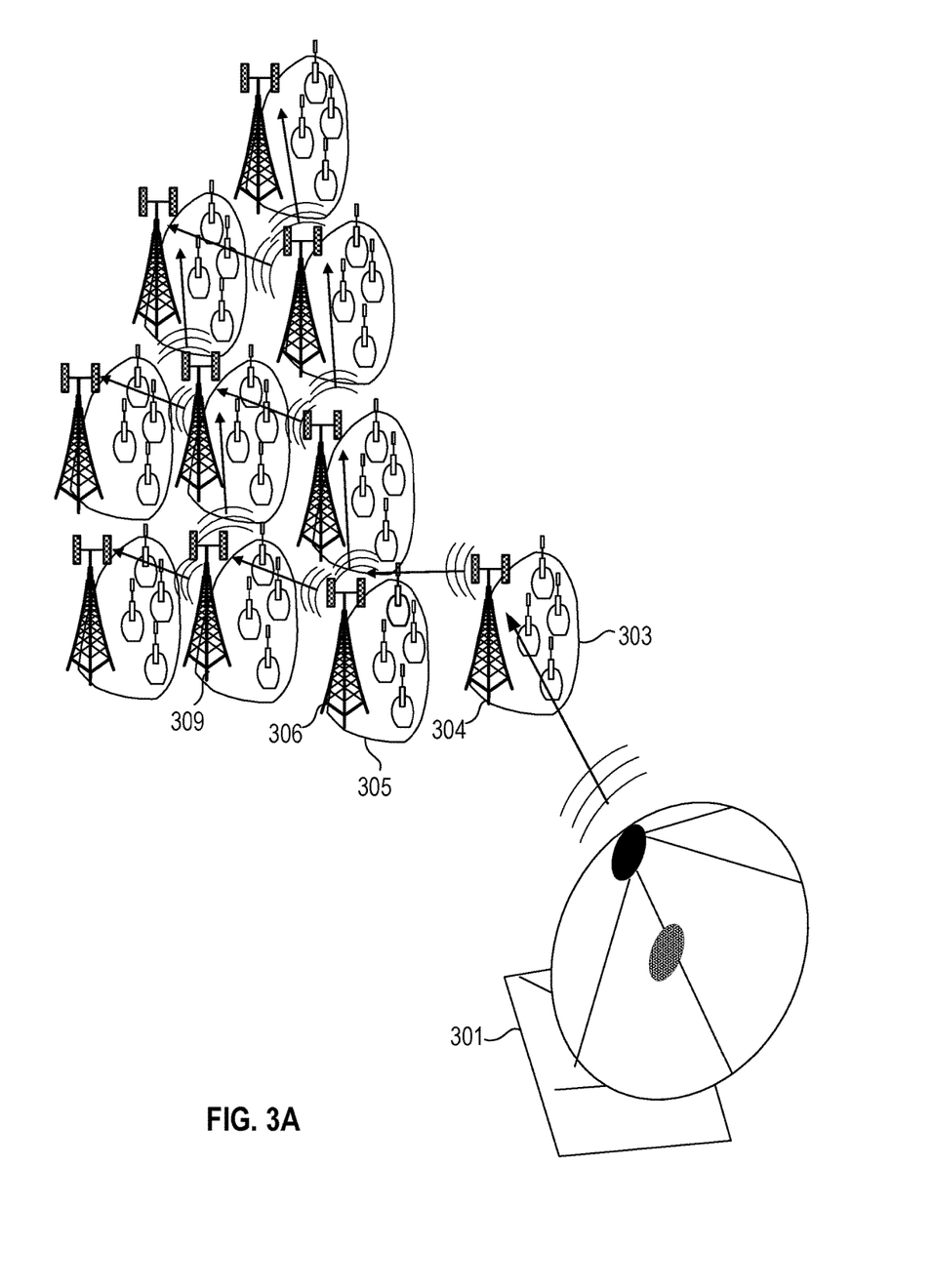
FIG. 3A shows an embodiment utilizing wireless transmission of signal-0.
Figure 3B:
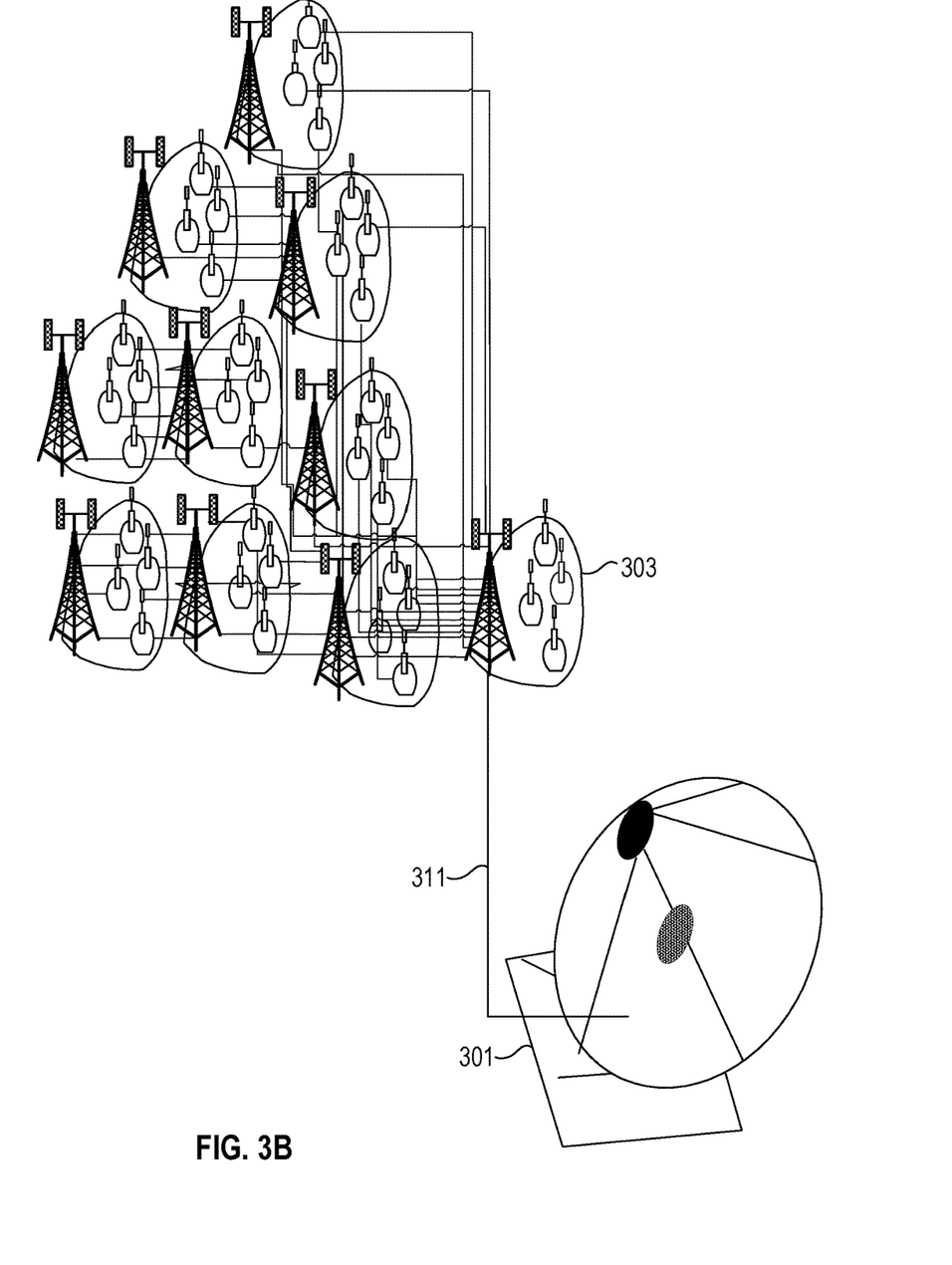
FIG. 3B shows an embodiment utilizing wired transmission of signal-0.
Figure 3C:
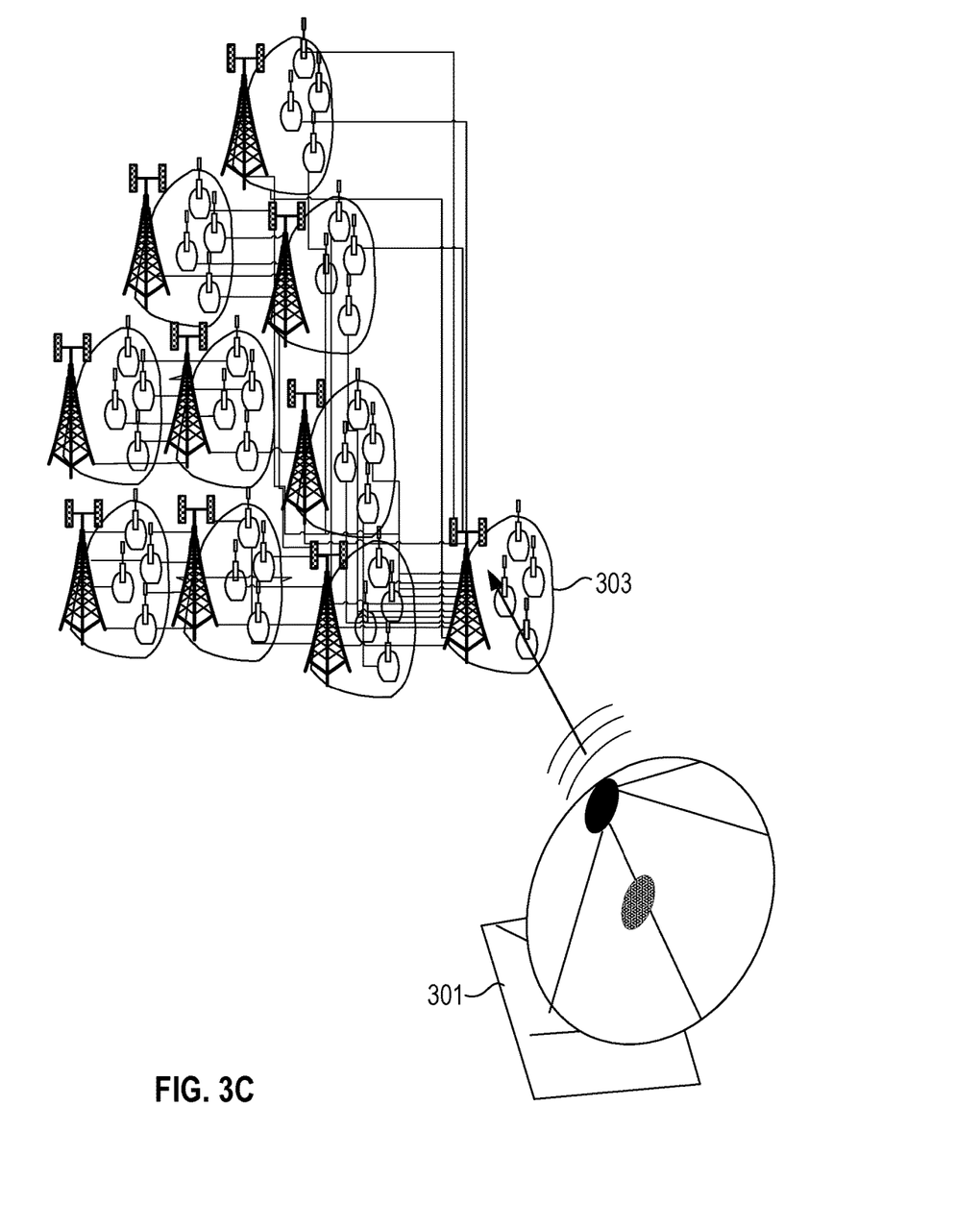
FIG. 3C shows an embodiment utilizing wired and wireless transmission of signal-0.

Referring to FIGS. 3A, 3B, and 3C, various approaches to propagating signal-0 to secondary users are shown. In FIG. 3A signal-0 is wirelessly transmitted from primary user node 301 (showed as a rotational radar) to the closest secondary users nodes in geographic region 303 (showed as macro radio base station and/or small cells). That may allow less power to be used in transmitting signal-0 as compared to the approach illustrated in FIG. 1. The signal-0 message may then be propagated wirelessly, to additional nodes 306 and 309 etc. The propagation through the location of spectrumX-use via wireless transmission continues until all secondary user nodes within the cluster in location of spectrumX have received the signal-0 message. The time to propagate the signal-0 message to all secondary users is constrained by the start time of the primary user of spectrumX after the initial signal-0 message is sent by the primary user.

FIG. 3B illustrates an embodiment in which signal-0 is transmitted from primary user node 301 (shown as a rotational radar) to the closest secondary user nodes in geographic region 303 (showed as enodeB or small cells) via wireline 311. Signal-0 is then propagated via wireline to the remaining secondary users nodes in the location of spectrumX-use. The signal-0 transmission, whether wireline or wireless, may be as simple as a sufficient number of bytes of information specifying spectrum, geographic location, and duration of use. Thus, the protocol may be very simple so as to be agnostic to the particular technology being utilized. As long as the bytes can be sent and received, the signal-0 message can be utilized.

FIG. 3C illustrates an embodiment in which a hybrid approach is used. Signal-0 is transmitted from primary user node 301 (shown as a rotational radar) to the closest secondary user nodes in region 303 via wireless transmission. Signal-0 is then propagated via wireline to the remaining secondary users nodes in the location of spectrumX-use. In other embodiments, additional hybrid approaches where any portion of the signal-0 propagation to secondary users nodes by the primary user nodes or other secondary users nodes may be via wireline or wireless. Of course secondary users should be aware of their geographic location in order to properly respond to the signal-0 message.

A viable method to propagate signal-0 information throughout the location of SpectrumX for an LTE network cluster is to allow the proximity base station (e.g. the one illustrated in region 303 in FIG. 3A), once it receives the signal-0 content from the primary user, to propagate signal-0 (and/or signal-1) including spectrum, region and duration to its neighbors over the X2 interface, such that if the X2 neighbor is within the location of spectrumX use, the X2 neighbor will re-transmit signal-0 and signal-1 over X2 to neighbors. The X2 interface provides communications between eNodeBs. However, if the X2 neighbor is beyond the location of spectrumX use the X2 neighbor takes no action, thus limiting the reach (and associated signaling overhead) of the signal-0 and signal-1 transmission(s).

Figure 4:
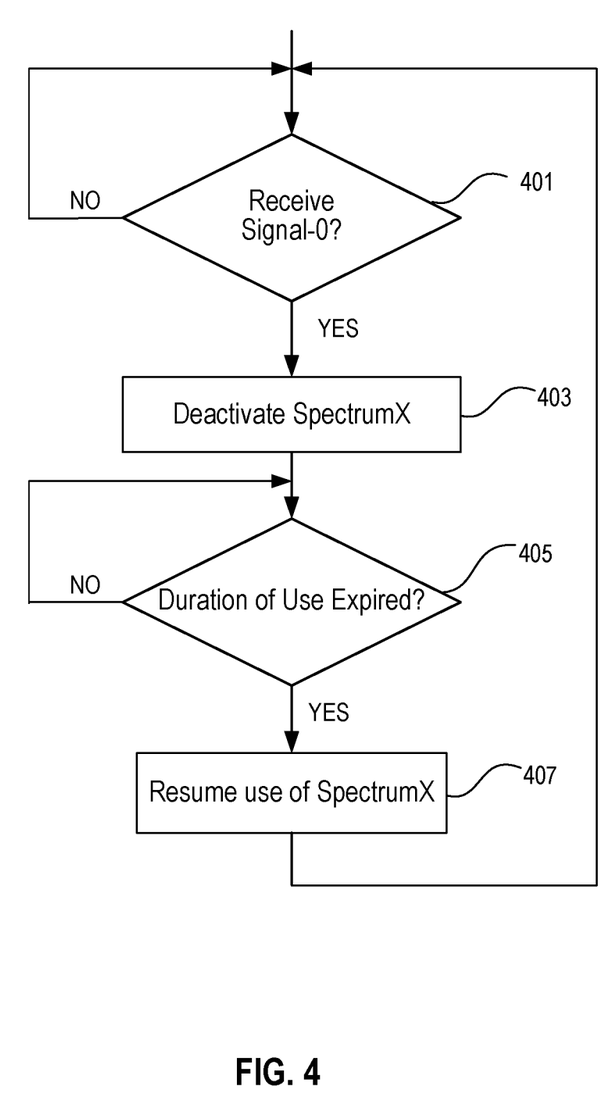
FIG. 4 illustrates a high level flow diagram of a secondary user deactivating and resuming use of spectrumX.

FIG. 4 illustrates a high level flow diagram of a secondary user node deactivating and resuming use of spectrumX. In 401 the secondary user node is assumed to be using spectrumX and is waiting for a signal-0 message. The secondary user node continues to wait for the signal-0 message in 401. When the signal-0 message is received, the secondary user node deactivates spectrum in 403. The secondary user node maintains spectrumX deactivated while waiting in 405 for a time period specified by the duration of use field in the signal-0 message to expire. When the time period has expired, indicating that the primary user node is no longer using spectrum, the secondary user node resumes using spectrumX (if desired) in 407.

Figure 5:
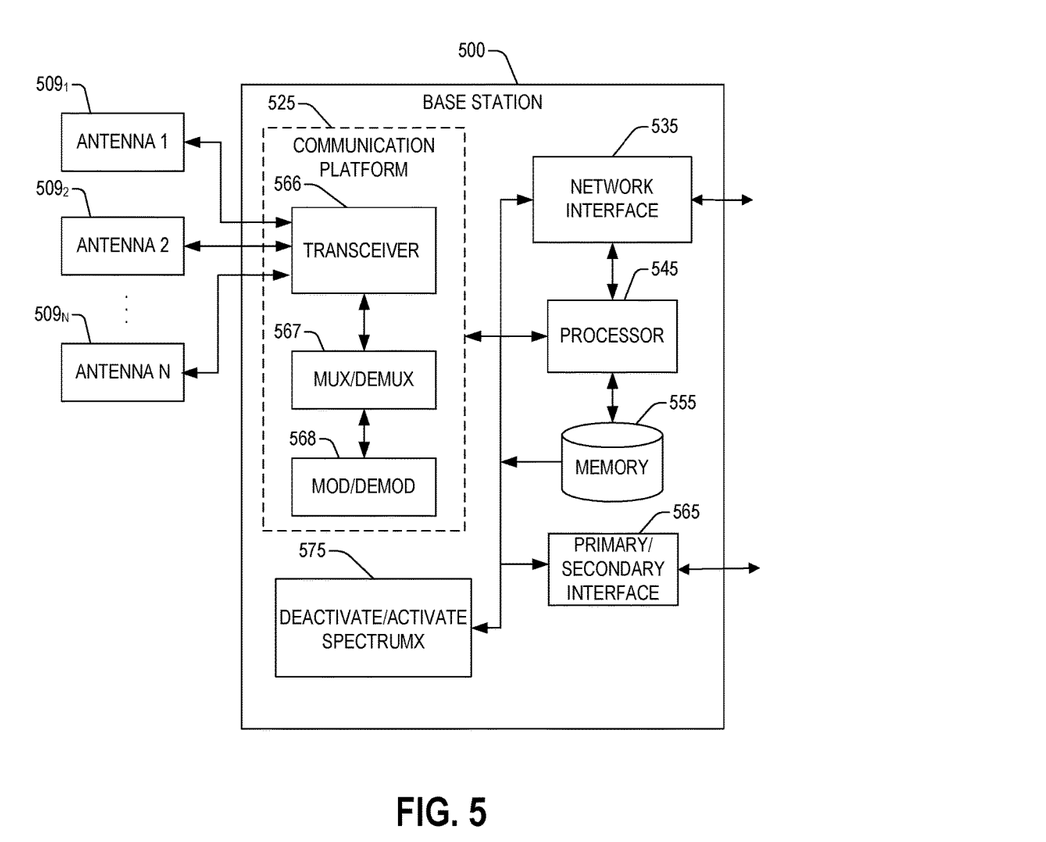
FIG. 5 illustrates and example of a base station that may be utilized in one or more embodiments.

FIG. 5 illustrates an exemplary base station, such as an eNodeB, small cell base station, or an access point for local area network. To provide further context for various aspects of the subject specification, FIG. 5 provides a high level block diagram of an example embodiment 500 of a base station that may be used to implement the spectrum access approach described herein. For simplicity, FIG. 5 will be described simply as a base station with the understanding that the high level blocks implemented may be modified according to the needs of the specific radio technology used by the secondary user. In one aspect, the base station 500 can receive and transmit signal(s) (e.g., data traffic and control signals) to and from user equipment, through a set of antennas $509_1$-$509_N$, for example, utilizing some or all of the spectrum B1-B5 shown in FIG. 1. Antennas $509_1$-$509_N$ form part of communication platform 525, which includes electronic components and associated circuitry for processing received signal(s) (data and control) and for processing signals (data and control) to be transmitted. Communication platform 525 can include a transmitter/receiver (e.g., a transceiver) 566 that can convert signal(s) from analog format to digital format upon reception, and from digital format to analog format for transmission. In addition, transceiver 566 can divide a single data stream into multiple, parallel data streams, or perform the reciprocal operation. Coupled to transceiver 566 is a multiplexer/demultiplexer 567 that facilitates manipulation of signals in the time and/or frequency domain. Multiplexer/demultiplexer 567 can multiplex information (data/traffic and control/signaling) according to various multiplexing schemes such as time division multiplexing (TDM), frequency division multiplexing (FDM), orthogonal frequency division multiplexing (OFDM), filtered OFDM, etc. In addition, multiplexer/demultiplexer component 567 can scramble and spread information (e.g., codes) according to substantially any code known in the art. A modulator/demodulator 568 is also a part of communication platform 525, and can modulate information according to multiple modulation techniques, e.g., M-ary quadrature amplitude modulation (QAM), with M a positive integer), phase-shift keying (PSK), and the like. The communication platform 525 may include appropriate circuitry to decode the signal-0 message. For example, the signal-0 message may be in a format that varies according to whether the primary user is a TV broadcast or a radar and the communication platform 525 may be adapted to accommodate one or more signal-0 message formats.

Base station 500 also includes one or more processors 545 configured to confer functionality, at least partially, to substantially any electronic component in the base station 500, in accordance with aspects of the subject disclosure. In particular, processor 545 can facilitate implementing configuration instructions, which can include storing data in memory 555. In addition, processor 545 can facilitate processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 545 can manipulate antennas $509_1$-$509_N$ to facilitate beamforming or selective radiation pattern formation, which can benefit specific locations covered by the base station 500; and exploit substantially any other advantages associated with smart-antenna technology. Thus, the one or more processors 545 may include digital signal processing capability to effectuate necessary functions associated with reception and transmission of information via antennas $509_1$ to $509_N$. Thus, the one or more processors 545 may implement a significant portion of the processing in communication platform 525.

Memory 555 can store data structures, code instructions, and specify capabilities, code sequences for scrambling, spreading and pilot transmission, floor plan configuration, access point deployment and frequency plans, and so on. In one example, computer instructions to help implement the spectrum access scheme described in relation to FIGS. 1-3C and FIG. 4 may be stored in memory 555.

Processor 545 can be coupled to the memory 555 in order to store and retrieve information necessary to operate and/or confer functionality to communication platform 525, network interface 535 (e.g., that coupled the access point to core network devices such as but not limited to a network controller), and other operational components (e.g., multimode chipset(s), power supply source; not shown) that support the access point 500. The access point 500 can further include an interface 565 for wired communication with a primary user and/or other secondary users. Wired communications with primary and/or secondary users may instead utilize network interface 535. The access point may also include component 575 to activate/deactivate spectrumX in response to the signal-0 message. Thus, component 575 may cause deactivation of spectrumX in response to the signal-0 command and reactivation of spectrumX at the end of the duration specified in the signal-0 message. In addition, it is to be noted that the various aspects disclosed in the subject specification can also be implemented through (i) program modules stored in a computer-readable storage medium or memory (e.g., memory 555) and executed by a processor (e.g., processor 545), or (ii) other combination(s) of hardware and software, or hardware and firmware.

In the subject specification, terms such as "data store," data storage," "database," "cache," and substantially any other information storage component relevant to operation and functionality of a component, refer to any form of memory that can store information and be read by computers or processors. Memory may be volatile memory or nonvolatile memory, or both. Nonvolatile memory can include read only memory (ROM), programmable ROM (PROM), electrically programmable ROM (EPROM), electrically erasable ROM (EEPROM), or flash memory. In addition nonvolatile memory can include magnetic and optical memory. Volatile memory can include random access memory (RAM), available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Thus, aspects of sharing spectrum between primary and secondary users with potentially very different technologies have been described. The description set forth herein is illustrative, and is not intended to limit the scope of the following claims. Variations and modifications of the embodiments disclosed herein may be made based on the description set forth herein, without departing from the scope of the following claims.

What is claimed is:

1. A method comprising:
    sending a first message from a primary user node, having a first access authority to use of a spectrum, to cause one or more secondary user nodes of the spectrum and one or more tertiary user nodes of the spectrum to stop use of the spectrum during a first time period, the one or more secondary user nodes having a second access authority to use of the spectrum that is lower than the first access authority, the one or more tertiary user nodes having a third access authority to use of the spectrum that is lower than the second access authority, the first message indicating that the primary user node wants use of the spectrum, and wherein the first message specifies a duration of use by the primary user node corresponding to the first time period;
    the primary user node using the spectrum during the first time period;
    a first secondary user node of the one or more secondary user nodes sending a second message to cause the one or more tertiary user nodes to stop use of the spectrum during a second time period, the second message indicating that the first secondary user node wants use of the spectrum for a second duration of use corresponding to the second time period;
    the first secondary user node using the spectrum during the second time period; and
    the one or more tertiary user nodes using the spectrum during a third time period following the second time period.

2. The method as recited in claim 1 further comprising:
    sending the first message from the primary user node to one of the one or more secondary user nodes; and
    sending information in the first message from the one of the one or more secondary user nodes to one or more additional secondary user nodes.

3. The method as recited in claim 2 further comprising:
    sending the first message from the primary user node to the one of the secondary user nodes over a wireline communication link or a wireless communication link.

4. The method as recited in claim 2 wherein the one of the secondary user nodes is a closest node to the primary user node.

5. The method as recited in claim 1 wherein the primary user node is a licensed user.

6. The method as recited in claim 1 wherein the primary user node is a radar and the spectrum is used by the radar.

7. The method as recited in claim 1 wherein at least some of the secondary user nodes are part of a wireless cellular communication system and the primary user node uses the spectrum for other than wireless cellular communications.

8. The method as recited in claim 1 further comprising:
    sending information in the first message from one of the one or more secondary user nodes to a first neighbor node of the one of the one or more secondary user nodes;
    the first neighbor node sending the information to a second neighbor node of the first neighbor node if the first neighbor node is in a geographic region of the spectrum specified in the information in the first message; and
    the first neighbor node taking no action in response to the information sent from the one of the one or more secondary user nodes if the first neighbor node is not in the geographic region of the spectrum specified in the information.

9. An apparatus comprising:
    a secondary user node configured to receive a message from a primary user node of a spectrum having a higher access authority to the spectrum than the secondary user node, the message indicating that the primary user node wants use of the spectrum and wherein the message specifies a duration of use by the primary user node; and
    wherein the secondary user node is responsive to the message to avoid use of the spectrum during the duration of use to thereby allow use of the spectrum by the primary user node;
    wherein the secondary user node is further configured to send a second message to one or more tertiary user nodes, the one or more tertiary user nodes having a lower access authority to the spectrum than the secondary user node, the second message indicating that the secondary user node wants use of the spectrum for a second duration of use.

10. The apparatus as recited in claim 9 wherein the secondary user node is further configured to disseminate the message to one or more other secondary user nodes of the spectrum having a lower access authority than the primary user node.

11. The apparatus as recited in claim 9 further comprising:
wherein the secondary user node is configured to receive the message over a wireline communication link.

12. The apparatus as recited in claim 9 wherein the secondary user node is a base station.

13. The apparatus as recited in claim 9 wherein the primary user node is a licensed user of the spectrum.

14. The apparatus as recited in claim 9 wherein the primary user node is a radar system.

15. The apparatus as recited in claim 9 wherein the secondary user node is part of a wireless cellular communication system and the primary user node uses the spectrum for other than wireless cellular communications.

16. The apparatus as recited in claim 9 wherein the one or more tertiary user nodes are responsive to the second message to avoid use of the spectrum for the second duration of use to thereby allow use of the spectrum by the secondary user node.

17. A system comprising:
a primary user having a first access authority to use of a spectrum;
a plurality of secondary users of the spectrum having a second access authority to use of the spectrum, the second access authority being lower than the first access authority;
a plurality of tertiary users of the spectrum having a third access authority to use of the spectrum, the third access authority being lower than the second access authority;
wherein the primary user is configured to send a first message to at least one of the secondary users, the first message specifying the spectrum, a geographic location, and a first duration of use of the spectrum by the primary user, the first message thereby indicating that the secondary users and the tertiary users should stop using the spectrum during a first time period corresponding to the first duration of use to thereby allow use of the spectrum by the primary user in the geographic location during the first time period; and
wherein a first secondary user of the plurality of secondary users is configured to send a second message to at least one of the tertiary users, the second message specifying the spectrum and a second duration of use of the spectrum by the first secondary user, the second message thereby indicating that the tertiary users should stop using the spectrum during a second time period corresponding to the second duration of use to thereby allow use of the spectrum by the first secondary user during the second time period.

18. The system as recited in claim 17 wherein one of the secondary users is configured to forward the first message to one or more others of the secondary users.

* * * * *